United States Patent
Anderson, Jr. et al.

(10) Patent No.: US 10,906,244 B2
(45) Date of Patent: Feb. 2, 2021

(54) ULTRASONIC REMOVAL METHODS OF THREE-DIMENSIONALLY PRINTED PARTS

(71) Applicant: Xerox Corporation, Norwalk, CT (US)

(72) Inventors: Robert B. Anderson, Jr., Syracuse, NY (US); Eliud Robles Flores, Rochester, NY (US); Timothy P. Foley, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 183 days.

(21) Appl. No.: 14/677,279

(22) Filed: Apr. 2, 2015

(65) Prior Publication Data
US 2016/0288420 A1 Oct. 6, 2016

(51) Int. Cl.
*B29C 64/245* (2017.01)
*B33Y 10/00* (2015.01)
*B33Y 30/00* (2015.01)
*B33Y 40/00* (2020.01)

(52) U.S. Cl.
CPC ............ *B29C 64/245* (2017.08); *B33Y 10/00* (2014.12); *B33Y 30/00* (2014.12); *B33Y 40/00* (2014.12)

(58) Field of Classification Search
CPC ......... B33Y 10/00; B33Y 30/00; B33Y 40/00; B29C 67/0051; B29C 67/0055; B29C 67/0059; B29C 67/0062; B29C 67/0085; B29C 67/0092; B29C 64/00; B29C 64/20; B06B 1/10; B08B 7/02
USPC ........... 425/436, 456; 264/71, 164, 344, 442
See application file for complete search history.

(56) References Cited

U.S. PATENT DOCUMENTS

| | | | | |
|---|---|---|---|---|
| 3,238,798 A * | 3/1966 | Yeasting | ............. | B07B 1/40 198/759 |
| 3,380,195 A * | 4/1968 | Bodine, Jr. | ............. | B08B 3/12 451/113 |
| 3,676,958 A * | 7/1972 | Garland | ............. | B24B 31/06 451/327 |
| 3,724,146 A * | 4/1973 | Fahey | ............. | B24B 31/06 241/175 |
| 4,052,217 A | 10/1977 | Watkinson | | |
| 4,120,699 A * | 10/1978 | Kennedy, Jr. | ............. | B08B 3/12 134/1 |
| 5,094,095 A | 3/1992 | Barrois et al. | | |
| 5,141,680 A | 8/1992 | Almquist et al. | | |
| 5,143,663 A * | 9/1992 | Leyden | ............. | B29C 64/135 118/423 |
| 5,204,055 A * | 4/1993 | Sachs | ............. | B05C 19/04 419/2 |
| 5,371,483 A * | 12/1994 | Bhardwaj | ............. | B06B 3/02 333/149 |
| 5,386,169 A * | 1/1995 | Dubruque | ............. | B06B 3/00 209/346 |

(Continued)

*Primary Examiner* — Matthew J Daniels
*Assistant Examiner* — Andrew D Graham
(74) *Attorney, Agent, or Firm* — Maginot Moore & Beck LLP

(57) ABSTRACT

An imaging device includes an ejector head configured to eject a material, a platen having a first surface configured to receive material ejected by the ejector head and support an object formed with the ejected material, a vibrator configured to vibrate, and a controller operatively connected to the vibrator. The controller is configured to operate the vibrator to vibrate and loosen material adhering to the first surface of the platen to enable the object to be removed from the platen.

9 Claims, 6 Drawing Sheets

(56) References Cited

U.S. PATENT DOCUMENTS

| | | | | |
|---|---|---|---|---|
| 5,718,279 | A * | 2/1998 | Satoh | B29C 33/3807 164/456 |
| 5,988,060 | A * | 11/1999 | Asai | H05K 3/1233 101/123 |
| 6,260,562 | B1 * | 7/2001 | Morinishi | H01L 21/67051 134/113 |
| 6,269,938 | B1 | 8/2001 | Lutz | |
| 6,571,702 | B2 | 6/2003 | Wotton et al. | |
| 6,662,812 | B1 * | 12/2003 | Hertz | B08B 7/028 134/1.3 |
| 6,799,959 | B1 * | 10/2004 | Tochimoto | B29C 41/12 425/130 |
| 7,114,943 | B1 * | 10/2006 | Fong | B29C 67/0092 264/308 |
| 7,293,567 | B2 * | 11/2007 | Hertz | B08B 7/028 134/1.3 |
| 8,911,199 | B2 | 12/2014 | Herrmann et al. | |
| 9,821,411 | B2 * | 11/2017 | Buller | B23K 26/346 |
| 2003/0015227 | A1 * | 1/2003 | Takayama | B08B 7/0007 134/184 |
| 2003/0154790 | A1 * | 8/2003 | Venturelli | B29C 35/0805 73/570.5 |
| 2006/0118656 | A1 * | 6/2006 | Griffith | A47L 11/38 239/280 |
| 2006/0288514 | A1 * | 12/2006 | Suehiro | B08B 7/02 15/303 |
| 2007/0126157 | A1 * | 6/2007 | Bredt | B33Y 40/00 264/334 |
| 2007/0235058 | A1 * | 10/2007 | Harrington | B08B 7/028 134/1 |
| 2009/0207493 | A1 * | 8/2009 | Ohashi | B08B 7/02 359/507 |
| 2009/0283119 | A1 * | 11/2009 | Moussa | B08B 3/02 134/57 R |
| 2011/0096397 | A1 * | 4/2011 | Ohashi | B06B 1/0269 359/507 |
| 2011/0120494 | A1 * | 5/2011 | Ifuku | B06B 1/0648 134/1 |
| 2011/0228389 | A1 * | 9/2011 | Ohashi | G02B 27/0006 359/507 |
| 2012/0195994 | A1 * | 8/2012 | El-Siblani | B29C 67/0092 425/174.4 |
| 2013/0146084 | A1 * | 6/2013 | Wetterich | B08B 7/02 134/1 |
| 2014/0220168 | A1 * | 8/2014 | Perez | B29C 37/0007 425/161 |
| 2014/0265032 | A1 | 9/2014 | Teicher et al. | |
| 2015/0069667 | A1 * | 3/2015 | Li | C23C 14/0005 264/442 |
| 2015/0089754 | A1 * | 4/2015 | Chan | B08B 17/02 15/94 |
| 2015/0147424 | A1 * | 5/2015 | Bibas | B29C 67/0088 425/150 |
| 2015/0217517 | A1 * | 8/2015 | Karpas | B33Y 30/00 264/464 |
| 2015/0266157 | A1 * | 9/2015 | Summers | B24B 31/062 451/32 |
| 2015/0266211 | A1 * | 9/2015 | Wolfgang | B33Y 40/00 264/69 |
| 2015/0352662 | A1 * | 12/2015 | Sheehan | B23K 20/106 228/1.1 |
| 2015/0352790 | A1 * | 12/2015 | Hadas | B29C 64/118 700/119 |
| 2016/0075091 | A1 * | 3/2016 | Cable | B29C 64/20 264/334 |
| 2016/0136759 | A1 * | 5/2016 | Broda | B22F 3/1055 219/76.1 |
| 2016/0179064 | A1 * | 6/2016 | Arthur | G05B 15/02 700/98 |
| 2016/0193788 | A1 * | 7/2016 | Din | B29C 67/0055 425/150 |
| 2016/0228990 | A1 * | 8/2016 | Bruck | B23K 26/70 |
| 2016/0271875 | A1 * | 9/2016 | Brown, Jr. | B29C 67/0066 |
| 2016/0279871 | A1 * | 9/2016 | Heugel | B22F 3/1055 |
| 2017/0144250 | A1 * | 5/2017 | Gold | B23K 26/062 |

* cited by examiner

ULTRASONIC REMOVAL METHODS OF THREE-DIMENSIONALLY PRINTED PARTS

TECHNICAL FIELD

The system and method disclosed in this document relate to printers that produce three-dimensional objects and, more particularly, to systems and methods that remove three-dimensionally printed parts from such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

Once a part has been formed by a three-dimensional printing system on a surface of a planar support member of a three-dimensional printing system, the part is often difficult to remove. The difficulty arises because a layer of support material can hold the printed part securely to the planar support member. Often times, attempts to manually remove the printed part results in damage to the part due to the strong hold of the layer of support layer between the surface of the planar support member and the printed part. Particularly thin or weaker portions of the printed part are especially vulnerable to such damage during removal. Therefore, a method for removing a printed part from a planar support member of a three-dimensional printing system that preserves the structural integrity of the printed part would be beneficial.

SUMMARY

A three-dimensional object printer facilitates the removal of parts from a platen with little or no damage to the parts. The printer includes an ejector head configured to eject a material, a platen having a first surface configured to receive material ejected by the ejector head and support an object formed with the ejected material, a vibrator configured to vibrate, and a controller operatively connected to the vibrator, the controller being configured to operate the vibrator to vibrate and loosen material adhering to the first surface of the platen to enable the object to be removed from the platen.

A method for operating a three-dimensional printer facilitates the removal of parts from a platen with little or no damage to the parts. The method includes operating an ejector head with a controller to eject a material onto a first surface of a platen to form an object, and operating a vibrator with the controller to vibrate and loosen material adhering to the first surface of the platen to enable the object to be removed from the platen.

BRIEF DESCRIPTION OF THE DRAWINGS

The foregoing aspects and other features of the present disclosure are explained in the following description, taken in connection with the accompanying drawings, wherein.

DETAILED DESCRIPTION

Figure 1:
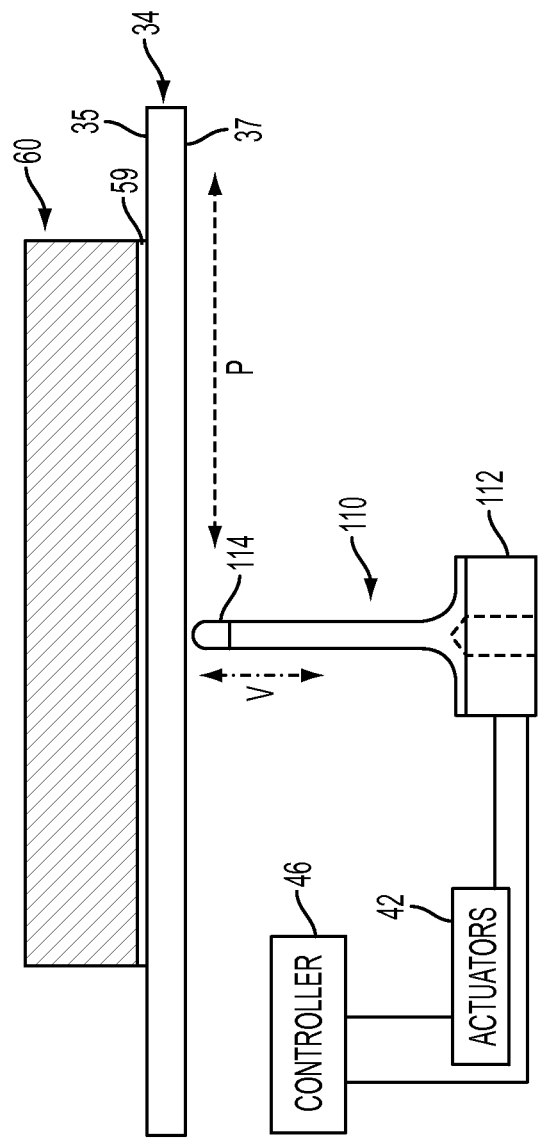
FIG. 1 is a side perspective view side view of the planar support member of a three-dimensional printing system supporting a printed part, and a vibrator configured to loosen the printed part from the planar support member.

For a general understanding of the present embodiments, reference is made to the drawings. In the drawings, like reference numerals have been used throughout to designate like elements.

Figure 6:
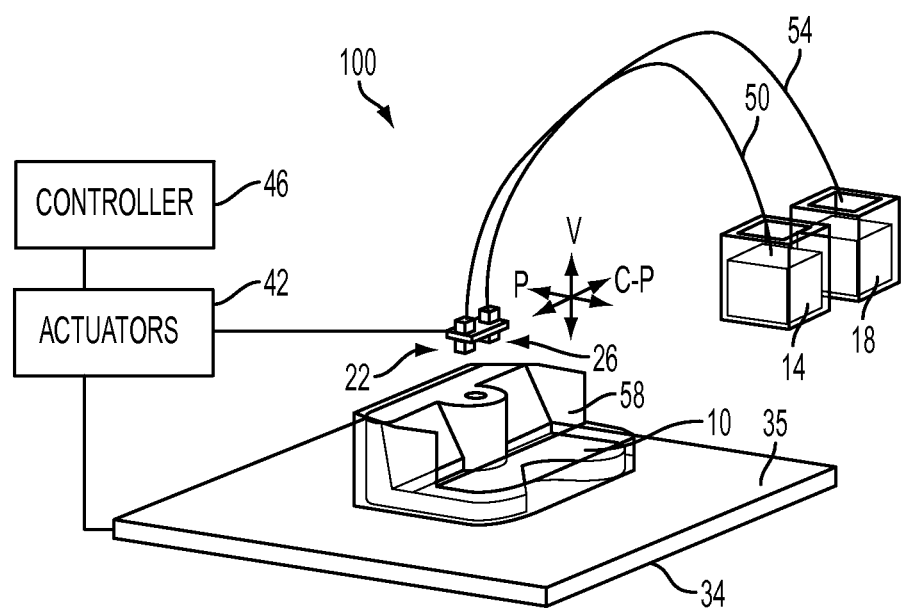
FIG. 6 is a perspective view of a prior three-dimensional printing system having printheads that have ejected material to the surface of a planar support member to form a three-dimensional part.

FIG. 6 shows a configuration of components in a printer 100, which produces a three-dimensional object or part 10. As used in this document, the term "three dimensional printer" refers to any device that ejects material with reference to image data of an object to form a three dimensional object. The printer 100 includes a support material reservoir 14, a building material reservoir 18, a pair of ejector heads 22, 26, a planar support member 34, actuators 42, and a controller 46. Conduit 50 connects ejector head 22 to support material reservoir 14 and conduit 54 connects ejector head 26 to building material reservoir 18. Both ejector heads are operated by the controller 46 with reference to three-dimensional image data in a memory operatively connected to the controller to eject the support and building materials supplied to each respective ejector head towards an upper surface 35 of the planar support member 34. The building material forms the structure of the part 10 being produced, while the support structure 58 formed by the support material enables the building material to maintain its shape while the material solidifies as the part is being constructed.

The controller 46 is also operatively connected to at least one and possibly more actuators 42 to control movement of the planar support member 34, and the ejector heads 22, 26 relative to one another. That is, one or more actuators can be operatively connected to the structure supporting the ejector heads to move the ejector heads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 6. The ejector heads 22, 26 also move in a direction that is orthogonal to the planar support member 34. This direction is called the vertical direction in this document, and is denoted with the letter "V" in FIG. 6. Movement in the vertical direction is achieved with one or more actuators operatively connected to the planar support member 34, by one or more actuators operatively connected to the ejector heads 22, 26, or by one or more actuators operatively connected to both the planar support member 34 and the ejector heads 22, 26. These actuators in these various configurations are operatively connected to the controller 46, which operates the actuators to move the planar support member 34, the ejector heads 22, 26, or both in the vertical direction.

Turning to FIG. 1, a part 60 is formed on the upper surface 35 of the planar support member 34 by operation of the ejector heads 22, 26 (FIG. 6). Removal of such a part can be difficult because the structure 58 (FIG. 6) can include a support layer 59 (FIG. 1), which is made of support material that adheres the part to the upper surface 35 of the planar support member 34. To facilitate removal, the printing system further includes a vibrator, such as the vibrator 110, which is configured to vibrate and loosen the printed part from the planar support member.

The vibrator 110 includes a vibrating element 112 configured to vibrate, and a contact element 114 operatively connected to the vibrating element 112 that engages a lower surface 37 of the planar support member 34 as shown in FIG. 1. The actuators 42 are operatively connected to the vibrator 110 to move the vibrator in a vertical direction V, a process direction P, and/or a cross-process direction C-P (FIG. 6) with reference to the planar support member 34 under control of the controller 46. Alternatively, the controller 46 is configured to operate the actuators 42 to move either or both of the vibrator 110 and the planar support member 34 with respect to each other in the vertical, process, and cross-process directions. The controller 46 is also operatively connected to the vibrating element 112. The controller 46 is configured to operate the vibrating element 112 to produce vibration selectively and is further configured to vary the intensity of the vibration produced by the vibrating element 112. Varying the intensity should be understood to mean that one or both of the frequency and the magnitude of the vibration is varied, or the length of time that the vibrator is controlled to vibrate a particular area is varied. A higher intensity is associated with a higher frequency or magnitude or both, or a relatively higher length of time that an area is subject to vibration, while a lower intensity is associated with a lower frequency or magnitude or both, or a relatively lesser length of time that an area is subject to vibration. The vibrating element 112 in some embodiments is an ultrasonic transducer configured to vibrate at high frequency. In other embodiments, the vibrating element is configured to vibrate at another desired frequency, or multiple frequencies, and with any desired vibrating magnitude or magnitudes that result in any desired vibration intensity.

In operation, the controller 46 operates the vibrating element 112 of the vibrator 110 to produce vibrations, and the actuators 42 to move the vibrator 110 with the contact head 114 of the vibrator 110 engaging the lower surface 35 of the planar support member 34 as shown in FIG. 1. The vibrations produced by element 112 are transferred by the contact head 114 to the planar support member 34. In the embodiment shown, the contact head 114 transfers vibrations in a direction perpendicular to the lower surface 35 of the planar support member. However, the contact head 114 can be configured to contact the support member at any desired angle in order to transfer vibrations at any corresponding desired angle with respect to the planar support member. The vibrations in the planar support member 34 loosen or break the bond between the support layer 59 and the part 60 or between the part 60 and the planar support member 34 to enable the part to be readily removed without damaging the part 60. The vibrator can be controlled to move in the process direction P and the cross process direction C-P (FIG. 6) in some predetermined pattern while remaining in contact with the lower surface 37. For example, the vibrator 110 can be controlled with reference to image data of the part in order to vibrate portions of the lower surface 37 corresponding to the printed part. The vibrator 110 can be moved to vibrate the lower surface 37 along the entire or partial length of the object and along the entire or partial width of the object, or to vibrate the lower surface 37 at any location on the lower surface 37 below a portion of the printed part that assists in part removal.

Figure 2:
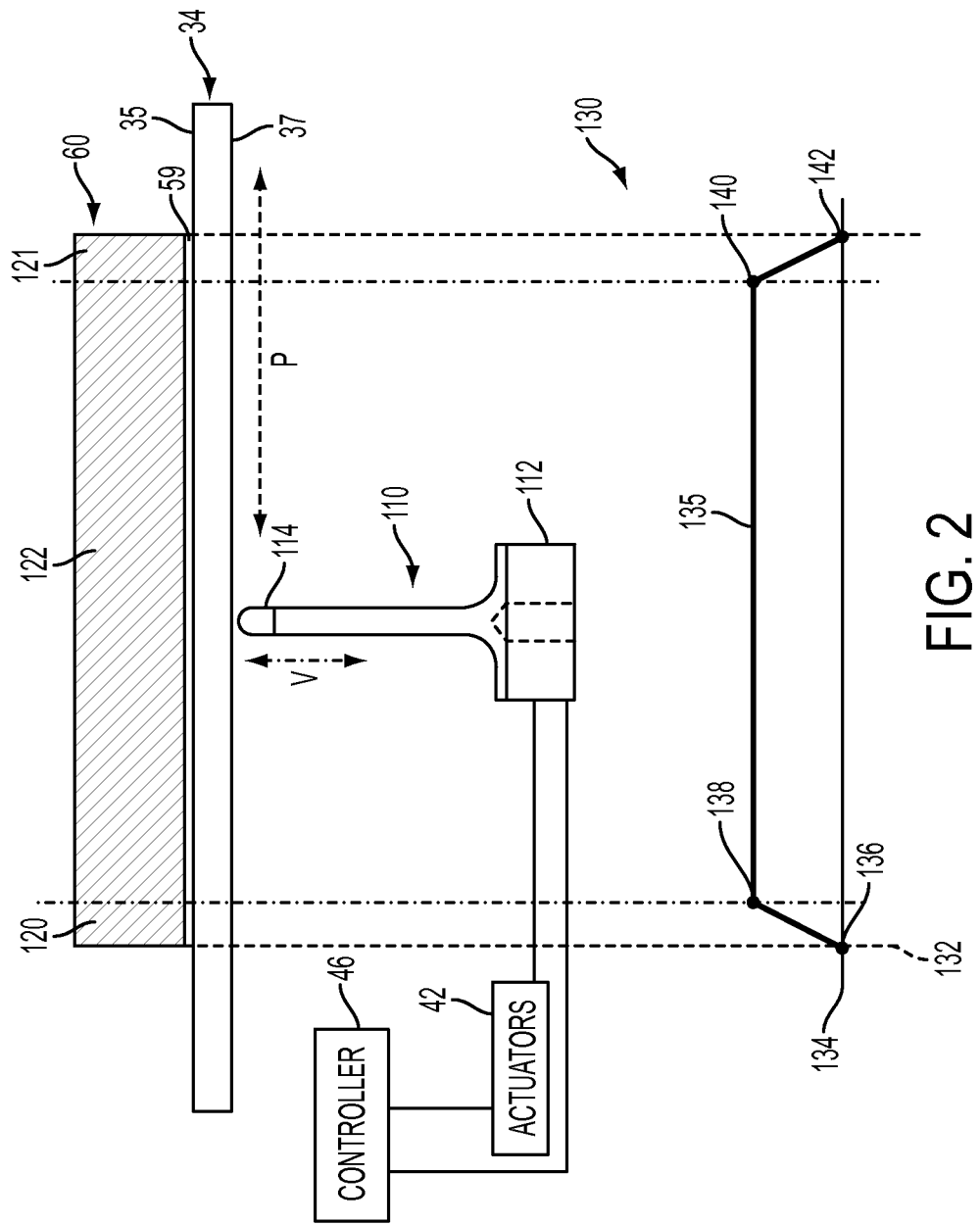
FIG. 2 is a side perspective view of the planar support member, printed part and vibrator of FIG. 1 with a vibration intensity profile aligned with the printed part and depicting the vibration intensity applied to the planar support member at locations along a section of the printed part.

The intensity of the vibrator 110 is configured to be controlled with reference to image data as the vibrator 110 is moved in engagement with the planar support member 34. For example, with reference to FIG. 2, the vibrator 110 is controlled to vibrate at a lower intensity at peripheral portions 120, 121 of the printed part 60, and a higher intensity at a central or non-peripheral portion 122 of the part 60 in order to ensure that the vibration does not damage the peripheral portion of the part 60, which may be weaker or at a greater risk of being damaged than a non-peripheral portion. In FIG. 2, an intensity profile 130 is shown aligned with the part 60 and planar supporting member 34. Vibration intensity is represented on a vertical axis 132, and location of the vibrator along the process direction P is represented on the horizontal axis 134. As represented by the plot line 135, the intensity is varied from an intensity of zero at the point 136 corresponding to an outer periphery of the part 60 and is increased as the vibrator is moved in the process direction through the peripheral portion 120 of the part 60 until the vibrator reaches the location that corresponds to point 138 in the profile, which is associated with the non-peripheral portion 122. The vibrator 110 is vibrated at a constant intensity while translating along the lower surface 37 of the planar support member 34 corresponding to the non-peripheral portion 122 until the vibrator reaches the peripheral portion 121 location that corresponds to point 140 in the profile. The constant intensity may correspond to a maximum intensity for a particular part, or the maximum intensity for the vibrating element. The reader should understand that the vibration intensity may also be varied while vibrating the non-peripheral portion 121. Finally, the vibration intensity is decreased until the vibrator reaches the location on the member that corresponds to the point 142 in the profile. While the vibration intensity is shown as zero at the outer periphery of the printed part, the reader should understand that a non-zero minimum intensity may also be utilized at the outer periphery.

Figure 3:
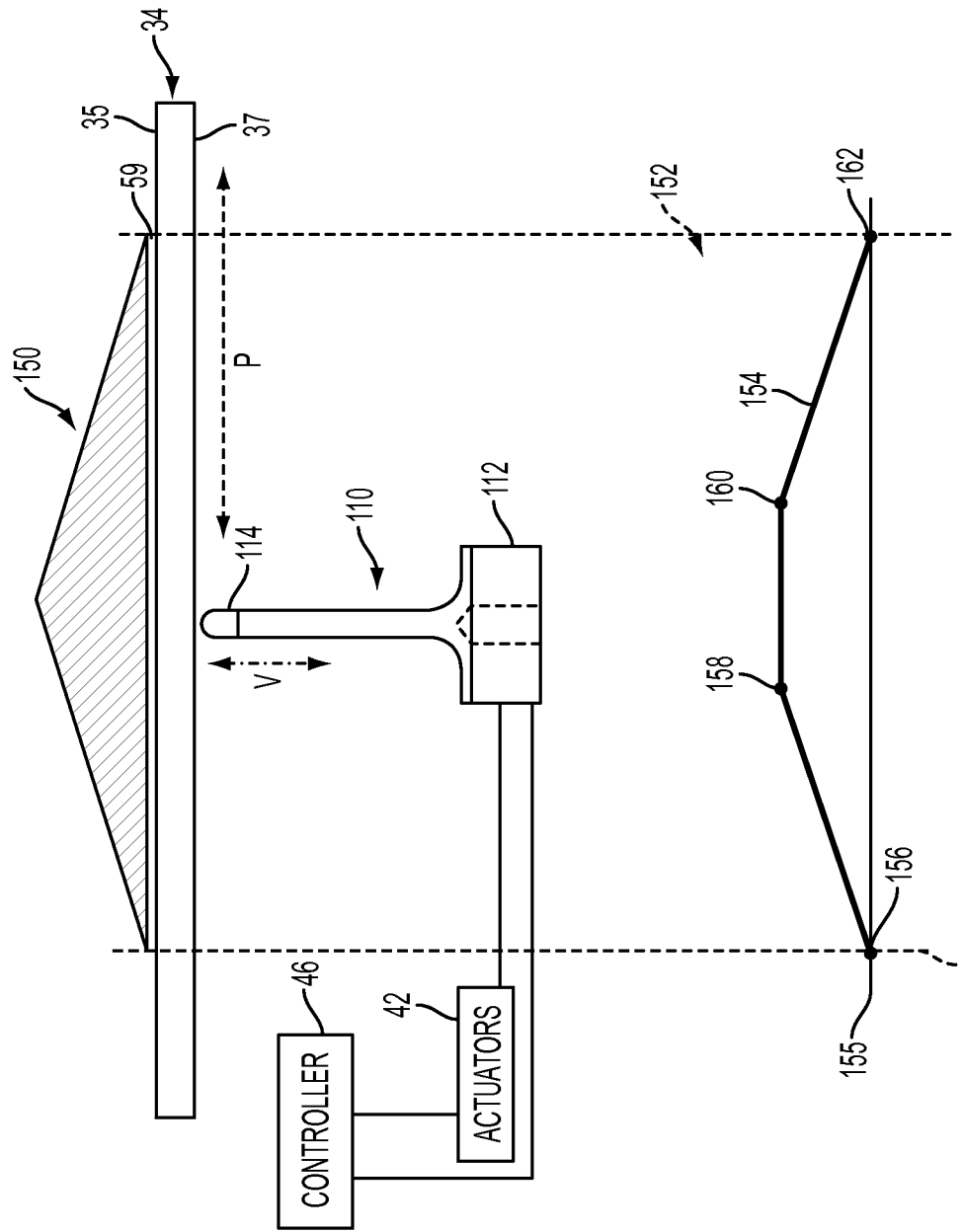
FIG. 3 is a side perspective view of a planar support member and vibrator of FIG. 1 with another printed part and another vibration intensity profile aligned with the printed part and depicting the vibration intensity applied to the planar support member at locations along a section of the printed part.

In another example shown in FIG. 3, a printed part 150 has a generally triangular shape in which the thickness of the part 150 varies along the process direction P. The relatively thin portions of the part 150 are subject to a higher risk of being damaged by vibrations from a vibrator than relatively thicker portions. As the vibrator 110 is moved in a process direction P, the vibrator 110 is controlled to vibrate at a relatively lower intensity at the positions along the portion of the lower surface 37 of the planar support member 34 corresponding to the relatively thinner or weaker sections of a part 150. These portions of the part 150 could be susceptible to damage at higher intensities that can be used at the relatively thicker or stronger sections of the part 150. In FIG. 3, an intensity profile 152 is shown aligned with the part 150 and planar supporting member 34. The vibration intensity is represented on the vertical axis 153, and the location of the vibrator with reference to the object 150 along the process direction P is represented on the horizontal axis 155. As shown by the plot line 154, the intensity is varied from an intensity of zero at the position on the member 34 that corresponds to the point 156 in the profile. This position corresponds to the thinnest portion of part 150. Part 150 increases in resilience to the vibrations as the vibrator moves in the process direction along the member 34 because the thickness of the part 150 also increases until the vibrator reaches the position that corresponds to point 158 in the profile. At that position, the controller maintains a constant vibration intensity until the vibrator 110 reaches the position that corresponds to the point 160 in the profile. The vibration intensity is then decreased from the position corresponding to the point 160 in the profile until the vibrator reaches the position corresponding to the point 162 in the profile because the thickness of the part 150 continually decreases in this area.

Although specific profiles are represented in FIGS. 2-3 that may be utilized to prevent damage at the perimeter and/or thinner or weaker sections of the printed part, the reader should understand that any profile can be utilized in order to free the printed part in a damage-free manner. For example, the intensity may be varied linearly, non-linearly, or in a stepped manner at the periphery or in relation to stronger or weaker portions of the printed part. Certain areas may be selectively vibrated, while other areas are not vibrated at all. The printed part at a peripheral portion, non-peripheral portion, relatively thinner or weaker portions, or relatively thicker or stronger portions may be vibrated at any desired intensity. The maximum and minimum intensity utilized for any portion of a printed part may also be selected based on any desired factor in order to ensure that the part may be removed without damage. Any desired profile may be utilized under control of the controller.

Moreover, while the vibrator 110 of the embodiment of FIGS. 1-3 has been described as engaging the lower surface 37 of the planar support member 34, in other embodiments, the vibrator engages the upper surface 35, or one of the side surfaces of the planar support member 34. In yet other embodiments, the vibrator is securely attached to the planar support member 34. In still other embodiments, the vibrator is positioned inside the planar support member. The vibrator may be moveably or fixedly positioned at any desired location in engagement with the planar support member in order to vibrate the planar support member to loosen the part on the planar support member.

Figure 4:
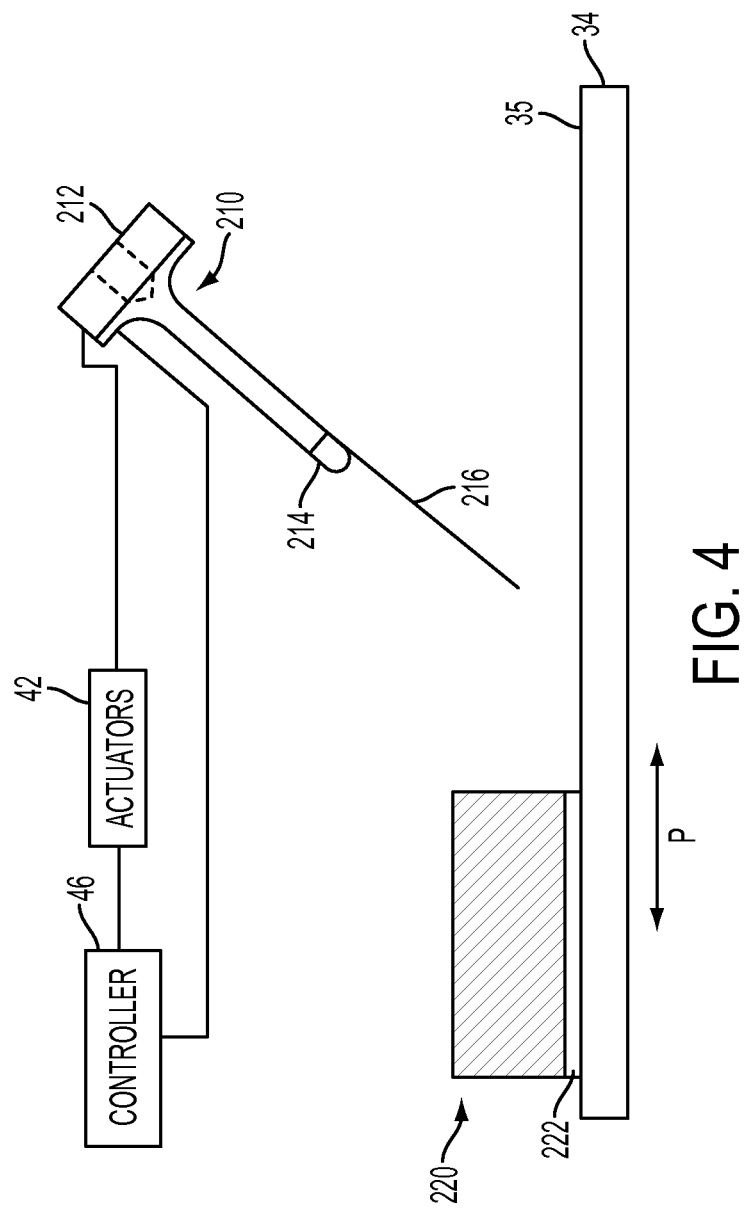
FIG. 4 is a side perspective view of a planar support member of FIG. 1 with a printed part and a vibrator having a blade configured to vibrate and scrape or cut away the printed part from the planar support member.

FIG. 4 depicts a vibrator 210, similar to the vibrator 110, having a vibrating element 212 configured to vibrate an end 214. Vibrator 210 further includes a blade 216 secured to the end 214. The actuators 42 are operatively connected to the vibrator 210 to move the vibrator in a vertical direction V, a process direction P, and a cross-process direction C-P (FIG. 6) with reference to the planar support member 34 under control of the controller 46. Alternatively, the controller 46 is configured to operate the actuators 42 to move either or both of the vibrator 210 and the planar support member 34 with respect to each other in the vertical, process, and cross-process directions. The controller 46 is also operatively connected to the vibrating element 212. The controller 46 is configured to operate the vibrating element 212 to produce vibrations and is further configured to vary the intensity of the vibration produced by the vibrating element 212. The vibrating element 212 in some embodiments is an ultrasonic transducer configured to vibrate at high frequency. In other embodiments, the vibrating element is configured to vibrate at another desired frequency, or multiple frequencies, and with any desired vibrating magnitude or magnitudes that result in any desired vibration intensity.

Figure 5:
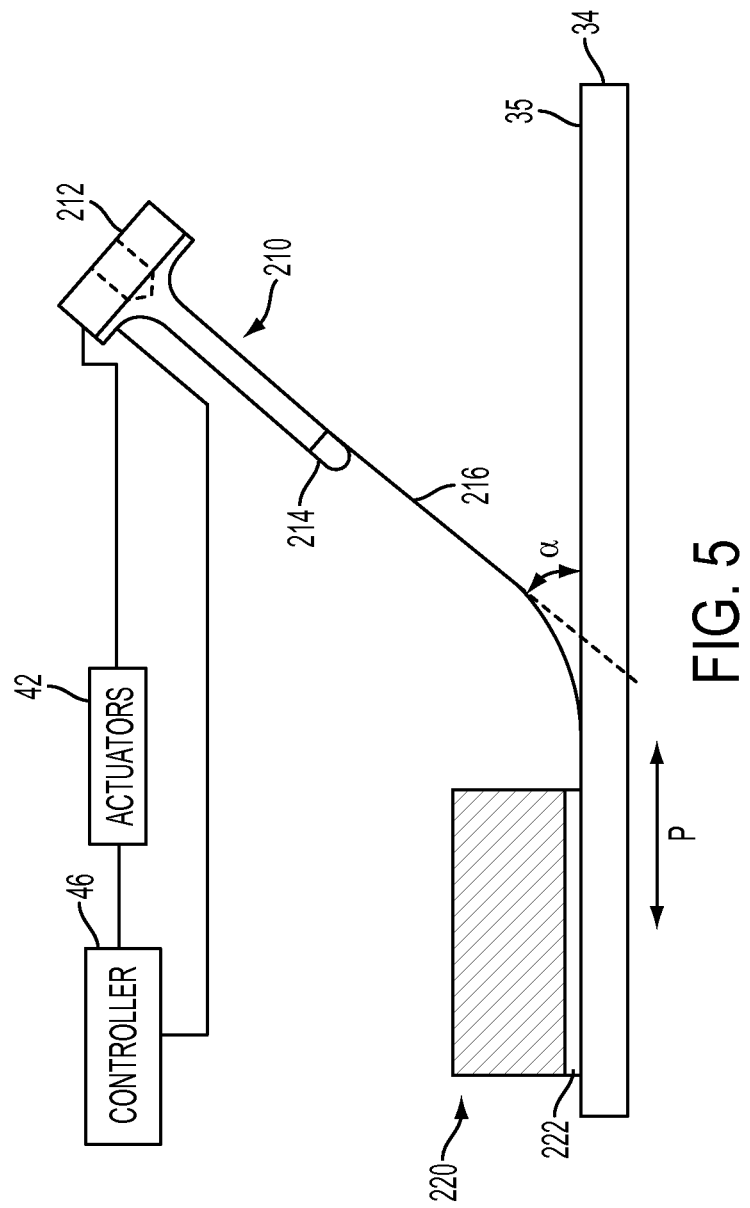
FIG. 5 is a side perspective view of the planar support member, printed part and vibrator of FIG. 4 depicting the blade in engagement with the planar support member.

As shown in FIG. 4, the printed object 220 includes a support layer 222 that adheres the part to the upper surface 35 of the planar support member 34. In order to break or loosen the bond without damaging the part 220, the vibrator 210 is configured to vibrate the upper surface of the planar support member 35 while scraping the interface of the support layer 222 with the upper surface 35 of the planar support surface 34 with the blade 216. Specifically, the controller 46 operates the vibrating element 212 of the vibrator 210 to produce vibrations. Vibrations from the vibrating element 212 are transferred through the end 214 to the blade 216 to cause the blade 216 to vibrate. The vibrations transferred to the blade 216 from the vibrating element 212 improve the scraping and cutting ability of the blade 216 to separate the part from the support member as compared to a non-vibrating blade. The controller 46 operates the actuators 42 to move the vibrator 210 so that the blade 216 engages the upper surface 35 of the planar support surface 34, as shown in FIG. 5, and moves the vibrator 210 in the process direction P and the cross process direction C-P (FIG. 6) with reference to a printed object 220. As shown in FIG. 5, the actuators 42 hold the vibrator 210 at an angle α with respect to the upper surface 35 causing the blade 216 to flex thereby forming a bend in the blade 216. With the bend developed in the blade 216, the angle of attack at which an end 218 of the blade 216 contacts the support layer 222 is reduced, which improves the scrapping and cutting action of the blade while reducing the chance that the part 220 is damaged because the blade 216 scrapes and cuts at an angle more closely aligned with the upper surface 35 of the planar support member 34. The vibrating blade 216 facilitates removal of the part 220 by scraping the printed part 220 with the support layer 222 from the upper surface 35 and/or cutting through the support layer 222. The reader should understand that any desired angle α may be utilized that facilitates removal of a printed part. Moreover, while controlling the actuators to move the vibrator 210 with a bend developed in the blade 216 has been described, the vibrator 210 may be positioned so that the blade bends at any desired angle with respect to the upper surface of the planar support surface, or without a bend at all.

In one embodiment of the apparatus shown in FIG. 5, the controller 46 operates the actuators 42 to move the vibrator 210 at a speed in a range of about 1400 to about 1800 mm/sec and to move the planar support member in direction P at a speed of about 2.54 mm/sec. The vibrator was an acoustic transducer and the blade holder angle α was set at about 37.5 degrees to enable the edge of the blade to engage the interface of the part and the upper surface of the planar support member. This embodiment was effective to loosen the adherence of the build material of the part from the material of the planar support member. A variety of materials were used for the planar support member. In one embodiment, the planar member was made of glass, in another the planar member was steel plate covered with a layer of chromium, and in another the planar member was steel plate covered with a layer of nickel. Effective removal of the part from the planar support member required blade angles of 30 degrees or greater. The frequency of the vibration was held relatively constant at 62.5 KHz, ±2 KHz. The controller 46 is also configured to operate the vibrating element 212 at a constant intensity, or to vary the intensity of the vibration produced by the vibrating element 212 of the vibrator 210 similarly to the vibrator 110 already described. The intensity and position of the vibrator 210 can be controlled with reference to image data, and according to any desired intensity profile.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A three-dimensional object printer comprising:
   an ejector head configured to eject a material;
   a platen having a first surface that is oriented so an entire area of the first surface has a same gravitational potential and the platen is positioned opposite the ejector head to receive material ejected by the ejector head and to support an object formed with the material ejected by the ejector head on the first surface of the platen, the platen also having a second surface that is opposite to the first surface and parallel to the first surface;
   a vibrator configured to engage the second surface of the platen and produce vibrations in the platen;
   an actuator operatively connected to the vibrator; and
   a controller operatively connected to the ejector head, the vibrator, and the actuator, the controller being configured to operate the ejector head with reference to image data of the object to eject material and form the object on the first surface of the platen, to operate the vibrator with reference to the image data of the object used to operate the ejector head to vibrate and produce the vibrations in the platen to loosen ejected material adhering to the first surface of the platen to enable the object to be removed from the first surface of the platen, and to operate the actuator to move the vibrator along the second surface of the platen as the vibrator vibrates the platen, the controller being further configured to operate the vibrator with reference to the image data used to operate the ejector head to vary an intensity of the vibration of the platen produced by the vibrator with reference to one or more positions to which the vibrator is moved along the second surface by the controller operating the actuator.

2. The three-dimensional object printer of claim 1, the controller being further configured to:
   operate the actuator to move the vibrator with reference to the image data of the object used to operate the ejector head to form the object.

3. The three-dimensional object printer of claim 2, the controller being further configured to:
   operate the vibrator with a first intensity at a position along the second surface of the platen to which the actuator moved the vibrator that is opposite a peripheral portion of the material ejected onto the first surface of the platen; and
   operate the vibrator with a second intensity that is greater than the first intensity at a position along the second surface of the platen to which the actuator moved the vibrator that is opposite a non-peripheral portion of the material ejected on the first surface of the platen.

4. The three-dimensional object printer of claim 1, the controller being further configured to:
   selectively vary an intensity of the vibration at a position along the second surface of the platen to which the actuator moved the vibrator with reference to a thickness of the material on the first surface of the platen that is opposite the position to which the actuator moved the vibrator.

5. The three-dimensional object printer of claim 4, the controller being further configured to:
   vary the intensity of the vibration produced by the vibrator with reference to one of magnitude and frequency of the vibration.

6. The three-dimensional object printer of claim 1, wherein the vibrator is an ultrasonic transducer.

7. A three-dimensional object printer comprising:
   an ejector head configured to eject a material;
   a platen having a first surface that is oriented so an entire area of the first surface has a same gravitational potential and the platen is positioned opposite the ejector head to receive material ejected by the ejector head and to support an object formed with the material ejected by the ejector head on the first surface of the platen;
   a vibrator positioned to engage and vibrate the first surface of the platen; and
   a controller operatively connected to the ejector head and the vibrator, the controller being configured to operate the ejector head with reference to image data of the object to eject material from the ejector head and form the object on the platen, to operate the vibrator with reference to the image data of the object used to operate the ejector head to vibrate and loosen material adhering to the first surface of the platen to enable the object to be removed from the platen, and to move the vibrator relative to the first surface of the platen and to operate the vibrator to vary an intensity of vibrations generated by the vibrator with reference to the image data of the object used to operate the ejector head to eject the material and form the object on the platen.

8. The three-dimensional object printer of claim 7, wherein the vibrator further comprises: a blade configured to vibrate and scrape material dried on the first surface of the platen.

9. The three-dimensional object printer of claim 8, wherein the vibrator is configured to vibrate the platen in a direction perpendicular to the first surface of the platen.

* * * * *